United States Patent
Qi et al.

(10) Patent No.: US 7,141,322 B2
(45) Date of Patent: Nov. 28, 2006

(54) ALCOHOL FUELED DIRECT OXIDATION FUEL CELLS

(75) Inventors: Zhigang Qi, North Arlington, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 525 days.

(21) Appl. No.: 10/187,082

(22) Filed: Jun. 27, 2002

(65) Prior Publication Data

US 2004/0001979 A1   Jan. 1, 2004

(51) Int. Cl.
*H01M 8/10* (2006.01)

(52) U.S. Cl. .............................. 429/13; 429/17; 429/30

(58) Field of Classification Search ................... 429/12, 429/17, 19, 30, 13
See application file for complete search history.

(56) References Cited

U.S. PATENT DOCUMENTS

| | | | |
|---|---|---|---|
| 3,113,049 A | 12/1963 | Worsham | |
| 4,262,063 A | 4/1981 | Kudo et al. | |
| 4,390,603 A | 6/1983 | Kawana et al. | |
| 4,478,917 A | 10/1984 | Fujita et al. | |
| 5,599,638 A | 2/1997 | Surampudi et al. | |
| 5,672,438 A | 9/1997 | Banerjee et al. | |
| 5,741,408 A | 4/1998 | Helmer-Metzmann et al. | |
| 6,248,460 B1 | 6/2001 | Surampudi et al. | |
| 6,492,047 B1 * | 12/2002 | Peled et al. | 429/30 |
| 6,794,071 B1 * | 9/2004 | Beckmann et al. | 429/23 |
| 6,808,838 B1 * | 10/2004 | Wilson | 429/34 |
| 2003/0165720 A1 * | 9/2003 | DeFilippis | 429/13 |
| 2003/0198858 A1 * | 10/2003 | Sun et al. | 429/43 |

OTHER PUBLICATIONS

Zhigang Qi et al, Electrochem. Solid-State Let., Low Temperature Direct 2-Propanol Fuel Cells, pp. A129-A130, Apr. 4, 2002.

* cited by examiner

*Primary Examiner*—Jonathan Crepeau
(74) *Attorney, Agent, or Firm*—Mark Levy & Associates, PLLC; David L. Banner (57) ABSTRACT

A fuel cell using a neat alcohol such as neat 2-propanol, as its fuel is described. The fuel that is purposely not mixed with any amount of water is oxidized directly at the fuel cell anode. The fuel cell can support a higher current density than a fuel cell using 1 M 2-propanol aqueous solution. The energy density of a fuel cell using a neat fuel is much higher than that of one using dilute fuel aqueous solutions.

8 Claims, 7 Drawing Sheets

ALCOHOL FUELED DIRECT OXIDATION FUEL CELLS

FIELD OF THE INVENTION

This invention relates to direct oxidation fuel cells and, more particularly, to a direct oxidation fuel cell using neat alcohol as the fuel.

BACKGROUND OF THE INVENTION

Hydrogen is the cleanest and most efficient fuel used in fuel cells. It is widely used in low temperature fuel cells like proton-exchange membrane (PEM) fuel cells, alkaline fuel cells, and phosphoric acid fuel cells, since its oxidation rate at the anode is high enough even at room temperature. However, producing pure hydrogen is not a trivial task. Hydrogen is normally produced through reforming hydrocarbon fuels such as methane, propane, and methanol. This not only makes the entire fuel cell system more complicated, it also dramatically increases its cost. Moreover, any carbon monoxide (CO) remaining in the reformed gas, even at ppm levels, will poison the electrodes of a PEM fuel cell and reduce its performance. In addition, transporting and storing hydrogen can be dangerous and difficult.

The problems associated with hydrogen have encouraged scientists to look for other fuels that can be directly oxidized without utilizing a reforming step. Methanol, the simplest alcohol containing only one carbon atom, is the most popular and widely used alternative. A direct oxidation fuel cell using methanol as the fuel is called a direct methanol fuel cell (DMFC). DMFCs have a long history. U.S. Pat. No. 3,113,049, issued to Worsham et al. on Dec. 3, 1961 for DIRECT PRODUCTION OF ELECTRICAL ENERGY FROM LIQUID FUELS, describes liquid feed, direct, methanol fuel cells.

Early DMFCs have used liquid electrolyte such as dilute sulfuric acid, for proton transportation. Sulfuric acid, however, can cause major problems when used as a liquid electrolyte, one of which is corrosion of the fuel cell materials. Sulfuric acid can also poison electrodes by the adsorption of sulfate anions, and cause leakage of electrolyte through the surrounding materials. For example, the electrolyte could gradually leak out through the pores of the air cathode, which also causes fuel loss and cathode poisoning. In order to alleviate such a leaking problem, a solid proton-exchange membrane was interposed between the anode and cathode. Nafion®, a perfluorinated polymer, made by E. I. DuPont, was used by Kudo et al. who were issued U.S. Pat. No. 4,262,063 on Apr. 14, 1981 for FUEL CELL USING ELECTROLYTE-SOLUBLE FUELS; and by Kawana et al. who were issued U.S. Pat. No. 4,390,603 on Jun. 28, 1983 for METHANOL FUEL CELL. U.S. Pat. No. 4,478,917, issued to Fujita et al. on Oct. 23, 1984 for FUEL CELL, uses sulfonated styrene-divinylbenzene co-polymers as the membrane.

Current fuel cell practice eschews the use of liquid electrolyte in a DMFC. U.S. Pat. No. 5,599,638, issued to Surampudi et al. on Feb. 4, 1997 for AQUEOUS LIQUID FEED ORGANIC FUEL CELL USING SOLID POLYMER ELECTROLYTE MEMBRANE, uses a proton exchange membrane such as Nafion membrane as the electrolyte. Nafion membranes have excellent chemical, mechanical, thermal, and electrochemical stability, and their ionic conductivity can reach as high as 0.1 S/cm. The kinetics of methanol oxidation and oxygen reduction at the electrode/Nafion membrane/electrode interfaces have been found to be more facile than those at the previously used electrode/sulfuric acid/electrode interfaces. This also has the advantage of reducing corrosion. The cell could also be operated at temperatures as high as 120° C., compared with sulfuric acid cells that tend to degrade at temperatures higher than 80° C. Also, the absence of conducting ions in the fuel/water solution substantially eliminated the parasitic shunt currents in a multi-cell stack. U.S. Pat. No. 6,248,460 B1 granted to Surampudi et al. on Jun. 19, 2001 (a continuation of U.S. Pat. No. 5,599,638), describes this type of cell.

In U.S. Pat. No. 5,904,740, issued to Davis on May 18, 1999 for FUEL FOR LIQUID FEED FUEL CELLS, a cell was described comprising a formic acid and methanol/water solution for the conduction of protons within the anode structure. Formic acid appeared to improve ionic conductivity and was clean burning. Furthermore, it did not poison the catalysts.

Unfortunately, methanol still presents a serious cross over problem through the Nafion and other similar types of proton-exchange membranes. This result is due to its physical diffusion, and electro-osmotic drag by protons. Such a crossover not only results in a large waste of fuel, but also greatly lowers the cathode performance.

Most of the methanol that crosses over will be electrochemically oxidized at the cathode. Such oxidation reactions not only lower the cathode potential, but also consume some oxygen. Should the reaction intermediate, such as carbon monoxide, become adsorbed to the catalyst surface, the cathode will be poisoned, further lowering the cell performance.

U.S. Pat. No. 5,672,438, issued to Banerjee et al. on Sep. 30, 1997 for MEMBRANE AND ELECTRODE ASSEMBLY EMPLOYING EXCLUSION MEMBRANE FOR DIRECT METHANOL FUEL CELL, describes a fuel cell having a thin layer of polymer. The polymer has a higher ratio of backbone carbon atoms to that of the cationic exchange side chain. This polymer can reduce the methanol crossover rate, albeit at the expense of increasing the membrane resistance. It was suggested that the polymer with higher carbon atom ratios be preferably oriented on the anode side.

In PCT International Patent No. WO 98/22989, issued to Prakash et al. on May 28, 1998, a fuel cell having a polymer membrane composed of polystyrene sulfonic acid (PSSA) and poly(vinylidene fluoride) (PVDF) is described. Such a PSSA-PVDF membrane exhibited lower methanol crossover, which translated into a higher fuel and fuel cell efficiency.

In PCT International Patent No. WO 01/93361 A2, granted to Pickup et al. on Dec. 6, 2001, a modified ion exchange membrane that possessed lower methanol crossover is described. The cell contained modified membranes comprising Nafion. The modification was accomplished in situ, by polymerization of monomers, such as aryls, heteroaryls, substituted aryls, substituted heteroaryls, or a combination thereof. The modified membrane was observed to exhibit reduced permeability to methanol, and was often observed without a significant increase in ionic resistance. Another barrier to the commercialization of DMFCs has been the sluggish methanol oxidation reaction. Moreover, some intermediates from methanol oxidation, such as carbon monoxide, can strongly adsorb onto the surface of catalysts. This can cause them to be seriously poisoned. Pt alloys like Pt/Ru have a much higher CO tolerance, so they are widely used as the anode catalyst.

Other short chain organic chemicals such as formic acid, formaldehyde, ethanol, 1-propanol, 1-butanol, dimethoxymethane, trimethoxymethane, and trioxane have been speculated as being useful fuels for direct oxidation fuel cells. U.S. Pat. No. 5,599,638, issued to Surampudi et al. on Feb. 4, 1997 for AQUEOUS LIQUID FEED ORGANIC FUEL CELL USING SOLID POLYMER ELECTROLYTE MEMBRANE describes experimental results in the use of dimethoxymethane, trimethoxymethane, and trioxane for direct oxidation fuel cells. It was claimed that dimethoxymethane, trimethoxymethane, and trioxane could be oxidized at lower potentials than methanol, and thus, could be better fuels than methanol. It was also claimed that only methanol was found to be the intermediate product from the oxidation of these fuels, and thus, it was not a concern because methanol would be ultimately oxidized to carbon dioxide and water. Using Nafion 117 as the membrane and oxygen as the oxidant at a pressure of 20 psig, cell voltages of 0.25 V, 0.50 V, and 0.33 V were achieved at a current density of 50 mA/cm$^2$ when dimethoxymethane, trimethoxymethane, and trioxane were used at cell temperatures of 37° C., 65° C., and 60° C., respectively.

Recently, Qi et al. discovered that secondary alcohols such as 2-propanol could perform much better than methanol in dilute aqueous solutions, especially at current densities less than approximately 200 mA/cm$^2$. This result is described in copending U.S. patent application Ser. No. 10/091,624, filed on Mar. 5, 2002 now U.S. Pat. No. 7,049,014; and in Electrochemical and Solid-State Letters, pp. A129–A130, June 2002. The better performance of this fuel appears to be the result of the faster kinetic reaction of 2-propanol, and the lower tendency for alcohol crossover.

All the direct oxidation fuel cells reported so far use dilute aqueous solutions as their fuels. The concentration of the fuel in the solution is normally less than 10% (wt.), and most frequently about 3% (wt.). The other 90–97% (wt.) is water. This not only results in a bulky fuel cell system, but also seriously limits its energy density. In addition, a large amount of water from the anode compartment transports through the membrane to the cathode side, and causes serious flooding of the cathode.

In order to decrease this flooding, a high airflow rate is normally utilized. Using a high airflow rate, however, not only consumes more parasitic power, but also makes it difficult to balance the water within the fuel cell system. In the event that the water that is taken away by exhaust air should not be effectively recovered, a larger water reservoir will be needed for the same amount of fuel.

The present invention provides a direct oxidation fuel cell using neat fuels. This eliminates the need to carry large amounts of water, thus reducing the bulkiness of the fuel cell system. A preferred fuel for such a fuel cell system is neat 2-propanol. The use of this neat fuel enhances the performance and efficiency of the cell. Higher energy densities are possible, and cathode flooding is eliminated.

SUMMARY OF THE INVENTION

The present invention features a direct oxidation fuel cell system that uses a neat alcohol as its fuel. The alcohol of choice is preferably a secondary alcohol, and specifically a neat 2-propanol (i.e., isopropanol). Such a fuel cell system eliminates the need of carrying a large amount of water, which is normally approximately 97% (wt.) of the total fuel mixture. Thus, the power density of the fuel cell system is dramatically increased. In addition, the neat 2-propanol fuel cell system can sustain higher current densities than fuel cell systems using a dilute 2-propanol aqueous solution. This effectively reduces alcohol crossover. Even at room temperature, the direct oxidation fuel cell using neat 2-propanol as its fuel provides very good performance.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, a direct oxidation fuel cell system that uses a neat alcohol as fuel is described. Such a fuel cell system eliminates the need of carrying large amounts of water, which is normally approximately 97% (wt.) of the total fuel mixture, in cells of this type. Thus, the power density of the fuel cell system is dramatically increased. In addition, the use of neat alcohol improves the current density of the system, and reduces the likelihood of cathode flooding.

Tests were carried out using a 25 cm$^2$ fuel cell test fixture. Unless otherwise specified, Pt/Ru and Pt blacks were used as the anode and cathode catalysts, and they were applied to Teflon®-treated 6- and 9-mil Toray paper, respectively, in order to achieve electrodes with Pt/Ru and Pt loadings of 4.8 and 7.8 mg/cm$^2$, respectively. These electrodes were hot-pressed onto a sulfonated polyetheretherketone membrane (SPEEK) to form a membrane-electrode assembly. The membrane was structured similarly to those described in U.S. Pat. No. 5,741,408, issued to Helmer-Metzmann et al. on Apr. 21, 1998 for POLYMER ELECTROLYTE MEMBRANE FOR USE IN FUEL CELLS AND ELECTROLYSIS CELLS.

Neat alcohol was pumped into the cell by a micropump and then re-circulated back into the fuel tank. The alcohol flow rate was controlled at 6.5 ml/min by a DC power supply. A condenser was used to condense the alcohol in the vapor phase and to allow the release of gaseous $CO_2$. The temperature of the alcohol tank was controlled by a hot plate. The connection between the alcohol tank and the cell was heated by heating tape. The temperatures of the fuel tank, inlet of alcohol to the cell, and the cell itself, were monitored by thermocouples. Ambient air was supplied to the cell, and its flow rate was adjusted using a flow meter.

Unless otherwise specified, air was humidified at the cell temperature by passing it through a stainless steel water bottle before it entered the cell.

Figure 1:
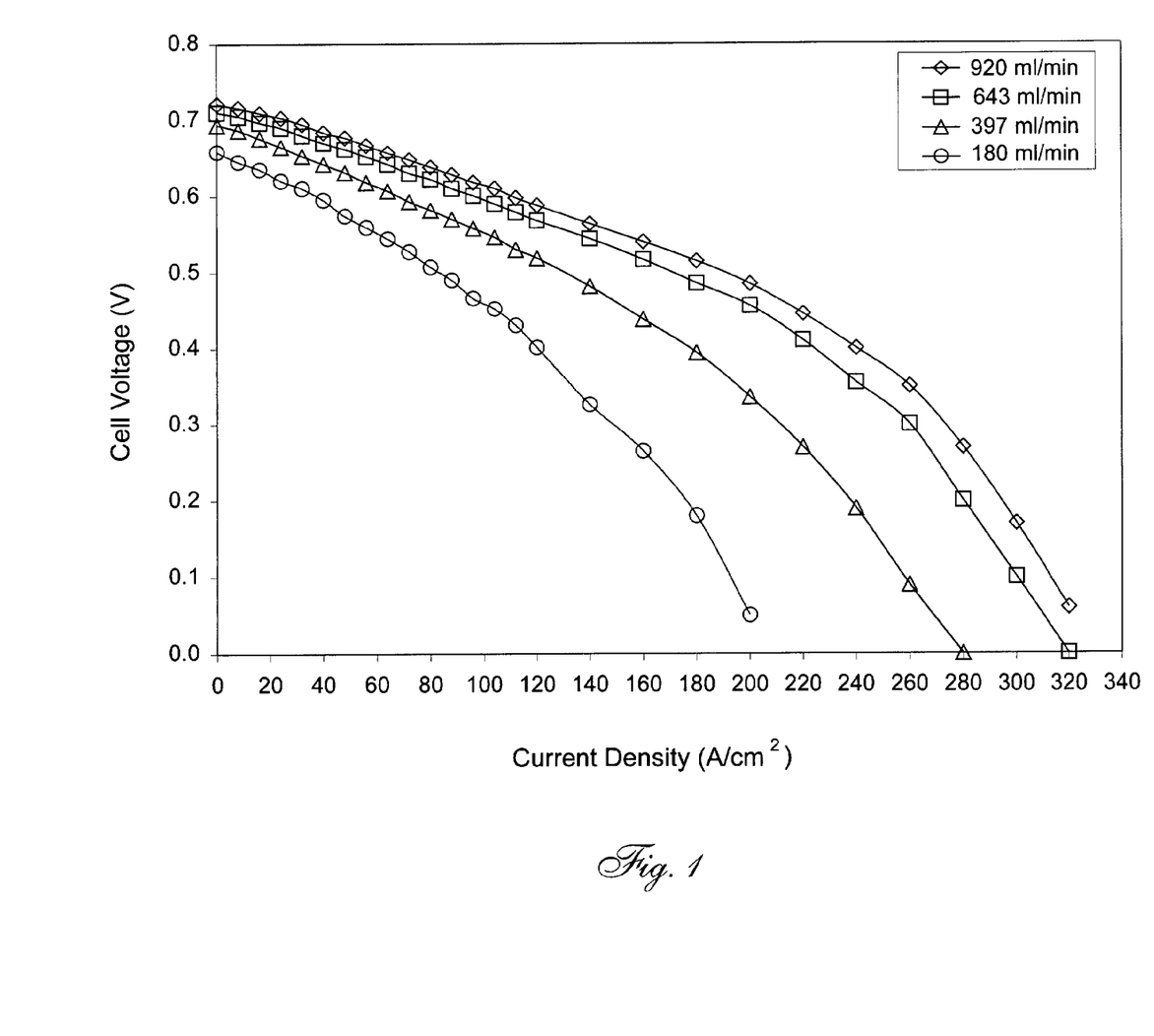
FIG. 1 illustrates a graph depicting the performance of a direct oxidation fuel cell using neat 2-propanol under different airflow rates, at a cell temperature of 60° C.

Now referring to FIG. 1, the graph shows the performance of the direct oxidation fuel cell utilizing neat 2-propanol, at a cell temperature of 60° C., and airflow rates of 180, 397, 643, and 920 ml/min, respectively. It is observed that the fuel cell performance increases apparently from an airflow rate of 180 to 397, and then on to 643 ml/min. Less of an increase was observed when it was further increased to 920 ml/min.

All the V-I curves have a linear region at lower current densities, and a curved, quick voltage decline region at higher current densities. In addition, the linear region extends to higher current densities at higher airflow rates. The cell performance is very impressive. For example, at the airflow rate of 920 ml/min, the cell voltage output was as high as 0.485 V, at a current density of 200 mA/cm$^2$, which corresponds to a power density of 97 mW/cm$^2$.

The use of neat 2-propanol showed decent performance even at temperatures close to room temperature.

Figure 2:
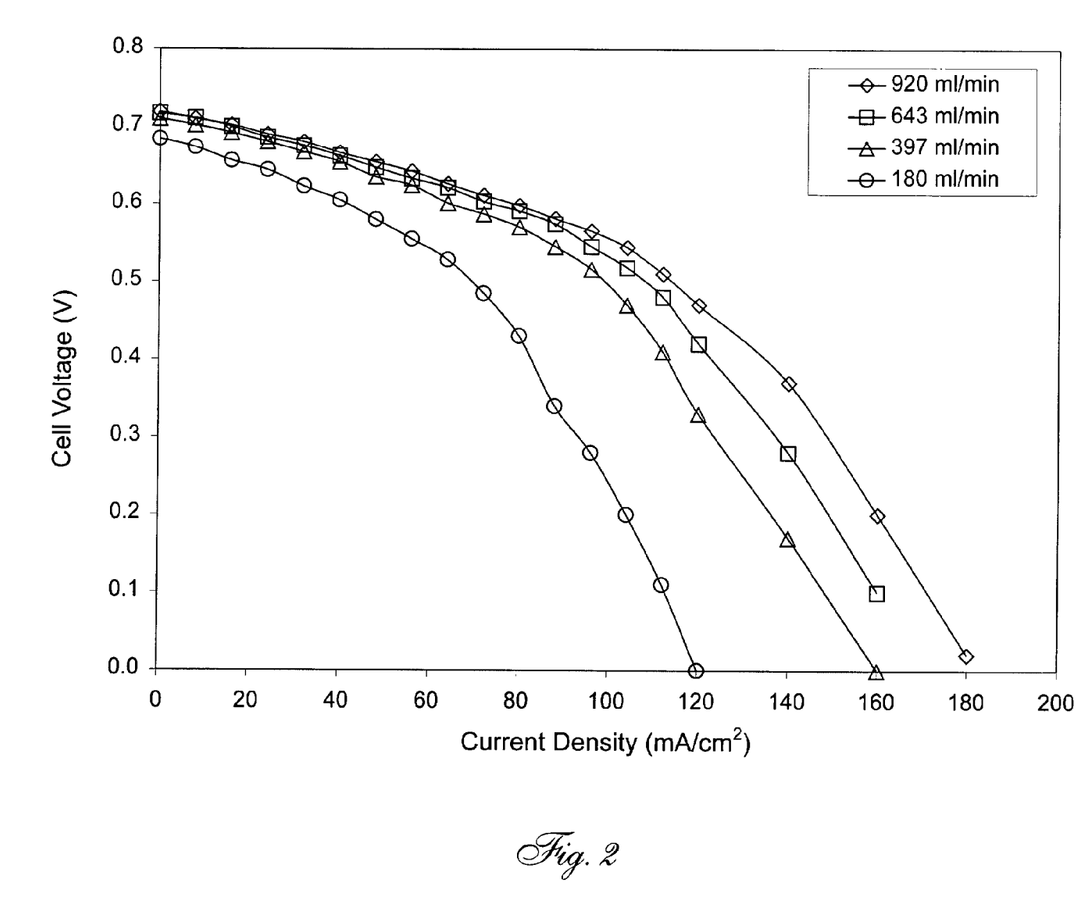
FIG. 2 shows a graph depicting the performance of a direct oxidation fuel cell using neat 2-propanol under different airflow rates, at a cell temperature of 30° C.

Referring to FIG. 2, the graph illustrates the fuel cell performance at a cell temperature of 30° C., under different airflow rates. A large increase was observed when the airflow rate was increased from 180 to 397 ml/min. Further increases in airflow rates only increased the cell performance slightly. The linear V-I region becomes shorter than that at 60° C., as shown in FIG. 1. At an airflow rate of 920 ml/min, the cell voltage output was 0.598 V, at a current density of 80 mA/cm$^2$, which corresponds to a power density of 48 mW/cm$^2$.

It was noted that the intermediates or products from the oxidation of 2-propanol seemed to poison the cell. Similar notification was observed when dilute 2-propanol aqueous solution was used as described by Qi et al. in Electrochemical and Solid-State Letters, pp. A129–A130, June 2002.

Figure 3:
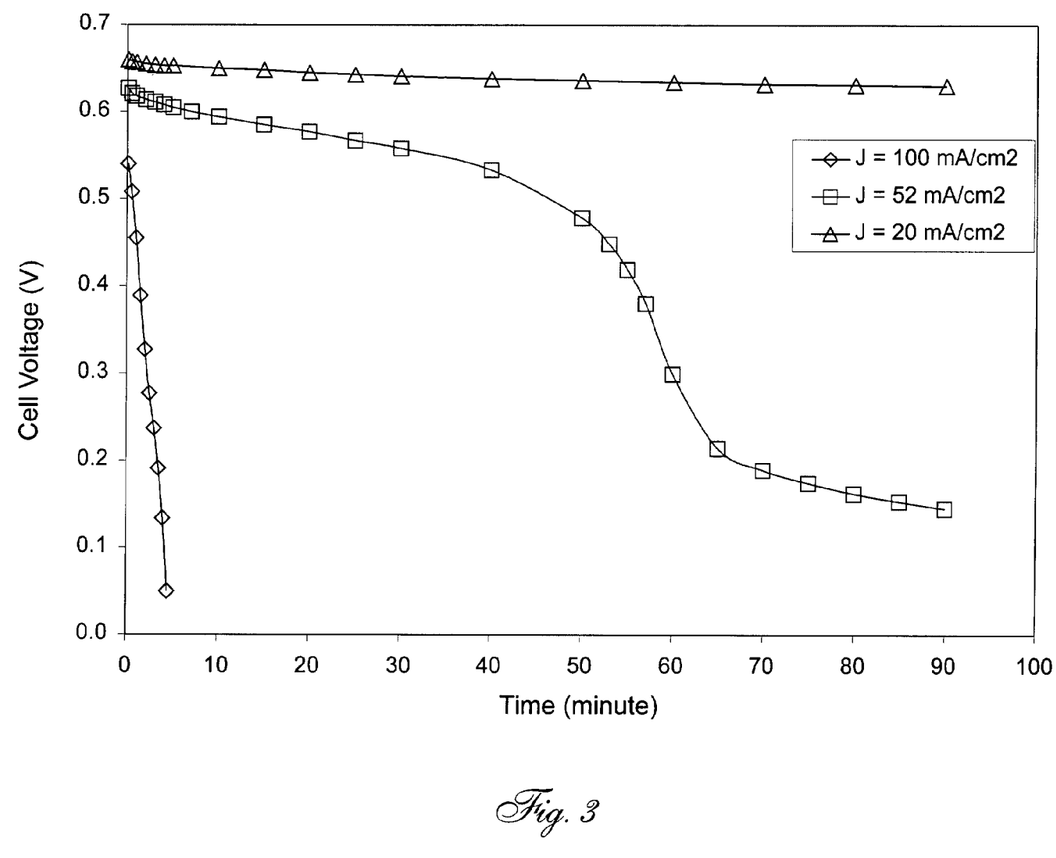
FIG. 3 depicts a graph showing the stability of a direct oxidation fuel cell using neat 2-propanol at current densities of 20, 52, and 100 mA/cm$^2$.

Referring to FIG. 3, the graph illustrates the fuel cell stability with respect to time, at three different current densities, at a cell temperature of 30° C., with an airflow rate of 397 ml/min. At a current density of 100 mA/cm$^2$, the cell lost its performance in five minutes. Obviously, the fuel cell could not be operated effectively at such a current density under this condition. The cell showed gradual decline within the first 40 minutes when the current density was reduced to 52 mA/cm$^2$. Then a quicker decline started, followed by another gradual decline. Such a declining pattern can be explained by the following postulation: the poisoning species accumulated onto the catalyst surface when the fuel cell was running, and after approximately 40 minutes of operation, the amount of accumulated poisoning species reached such a level that it quickly reduced the cell voltage. This quick cell voltage decline is probably due to an increase in the anode over-potential. The increase in anode over-potential weakens the adsorption strength of the poisoning species, and thus a slower voltage decline was followed. The cell operating at a current density of 20 mA/cm$^2$ only showed a slight decline within 90 minutes. It seemed that when an equilibrium adsorption of the poisoning species was reached, there were still enough active surfaces to support the current.

Figure 4:
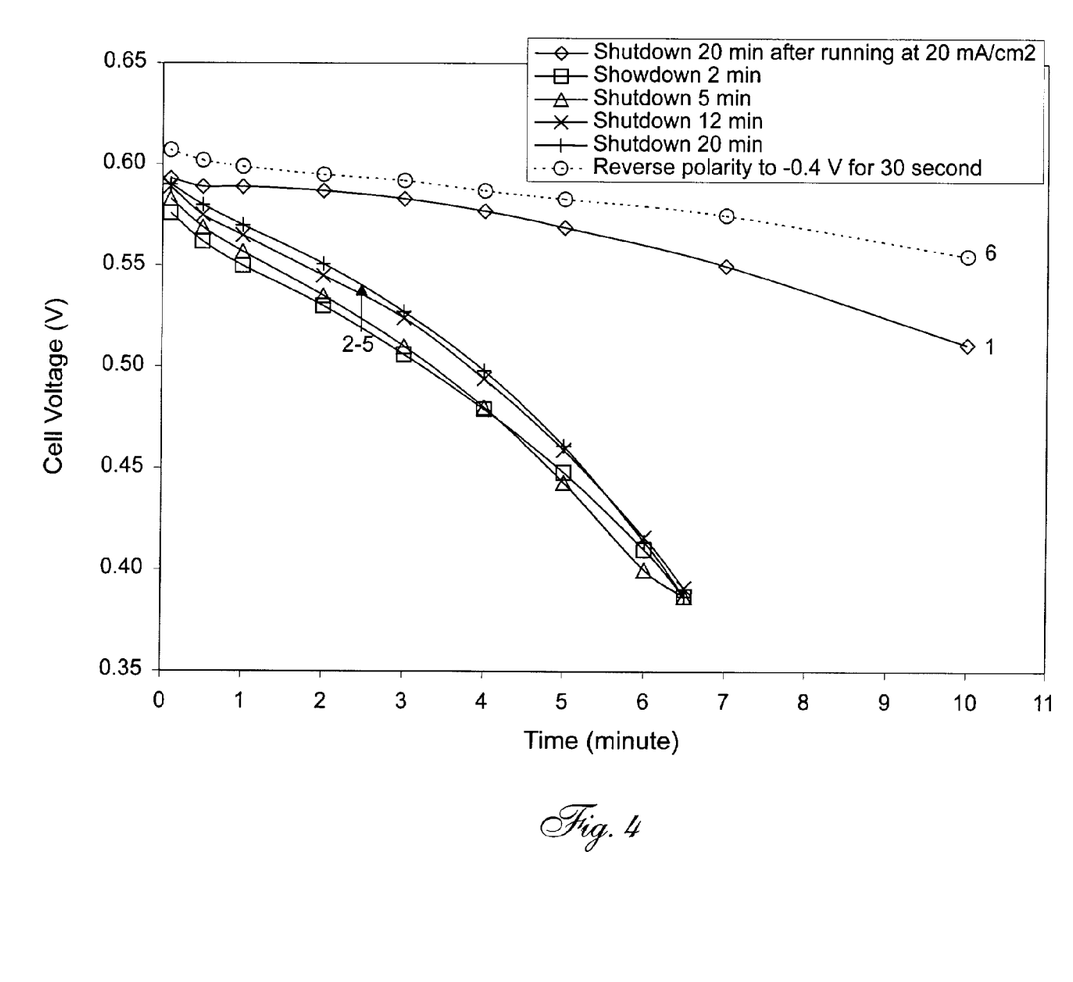
FIG. 4 illustrates a graph of a direct oxidation fuel cell that is idling, and the effect that idling has upon its refreshment.

It was found that the cell could refresh itself to a certain extent when it was not running, and some results are shown in FIG. 4. The cell was tested at a current density of 60 mA/cm$^2$ at 30° C. The first curve was taken after the cell was in a shutdown state for 20 minutes, following its being operated at 20 mA/cm$^2$. The cell was then shut down for two minutes, and then the second curve was plotted. During the shutdown period, the flow of both air and 2-propanol was stopped, and the cell was left at the open circuit state.

The second curve was lower than the first curve, and the voltage declined faster. This indicates that the poisoning accumulated during the operation of the first curve, and was carried over to the operation of the second curve. However, the cell performance in the first two minutes was better than before the cell was shut down (i.e., the last point on the first curve). This implies that the during the two-minute waiting period, the cell gained some extra active surface area (i.e., it refreshed itself to some extent) so that when it was restarted, it possessed a better performance; but the gain in active surface area was very limited, so the cell performance declined faster when the test was continued. Curves 3, 4, and 5 depict the results after the cell was shut down for five, 12, and 20 minutes, respectively. The cell performance increased slightly with a longer waiting period, indicating a little more refreshing occurred.

Finally, the polarity of the cell was switched to about −0.4 V (cathode minus anode) for 30 seconds, and the cell seemed to be largely refreshed, leading to a much better performance, as shown by curve 6. Self-refreshing by shutting down the cell was found to be more effective if the cell was operated at a smaller current density such as 20 mA/cm$^2$ between shutdown periods.

Application of direct oxidation fuel cells to handheld electronics such as cellular phones is an actively researched area worldwide. In such an application, the current density does not need to be high, but a high energy density is important. Customers prefer to have a power source that lasts a long time before recharging. Due to the superior performance of neat 2-propanol, a direct 2-propanol fuel cell could become a major choice. In addition, since the cell can refresh itself, when not in operation, it is particularly suitable for cellular phone-type electronics, which are not continuously used.

Figure 5:
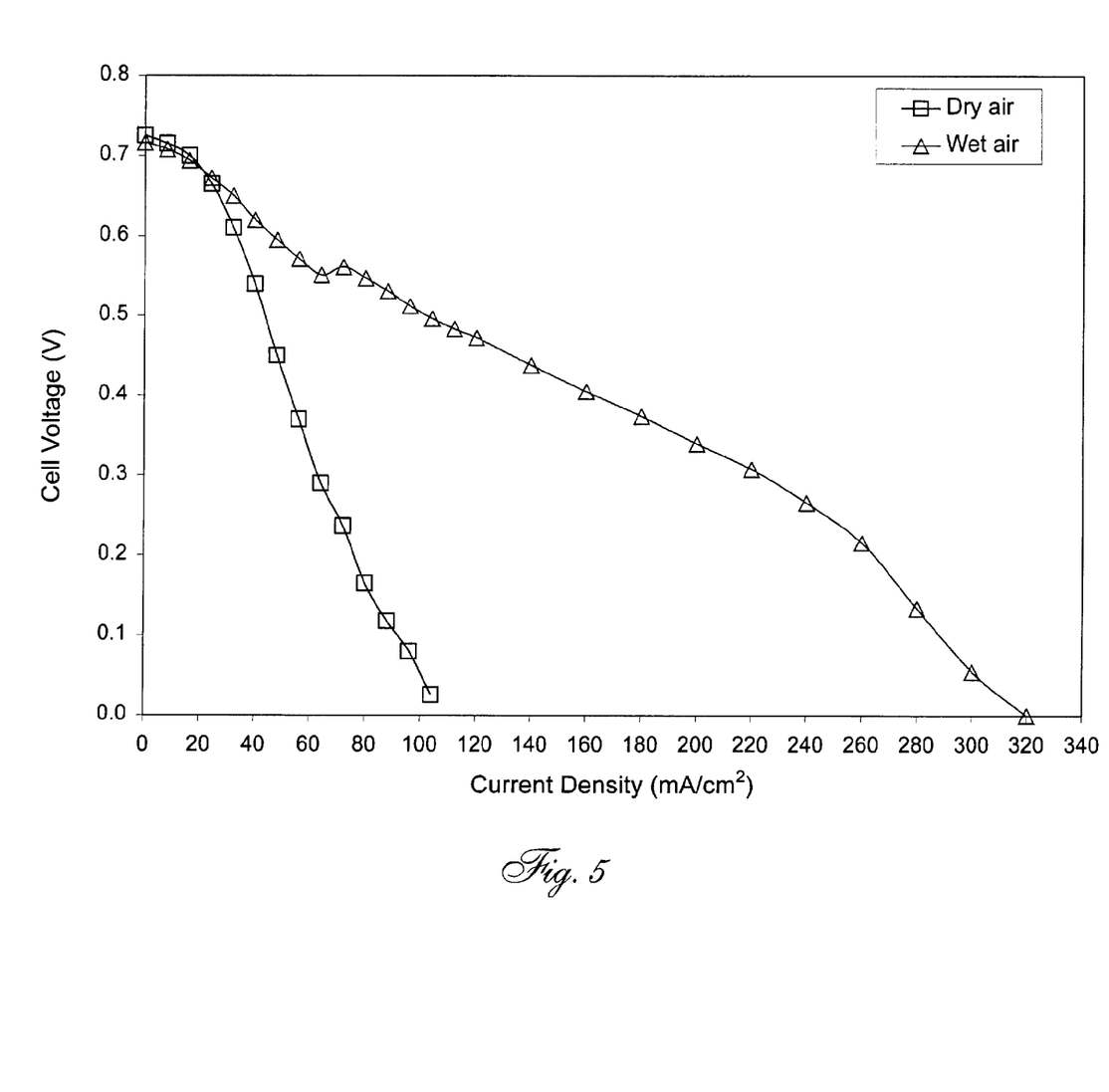
FIG. 5 shows a graph of the effect of air humidification on the performance of a direct oxidation fuel cell using 2-propanol.

Neat 2-propanol contains no water, and therefore, flooding of the cathode by water transported from the anode is prevented. Different from using a dilute fuel aqueous solution where membrane is fully hydrated, air humidification is needed to hydrate the membrane and the catalyst layer, as shown in FIG. 5.

The cell voltage dropped quickly when dry air was used. Humidifying the air increases the cell performance. Its performance was still not as good as the one shown in FIG. 1, probably because the membrane was not adequately hydrated when the data were taken.

Figure 6:
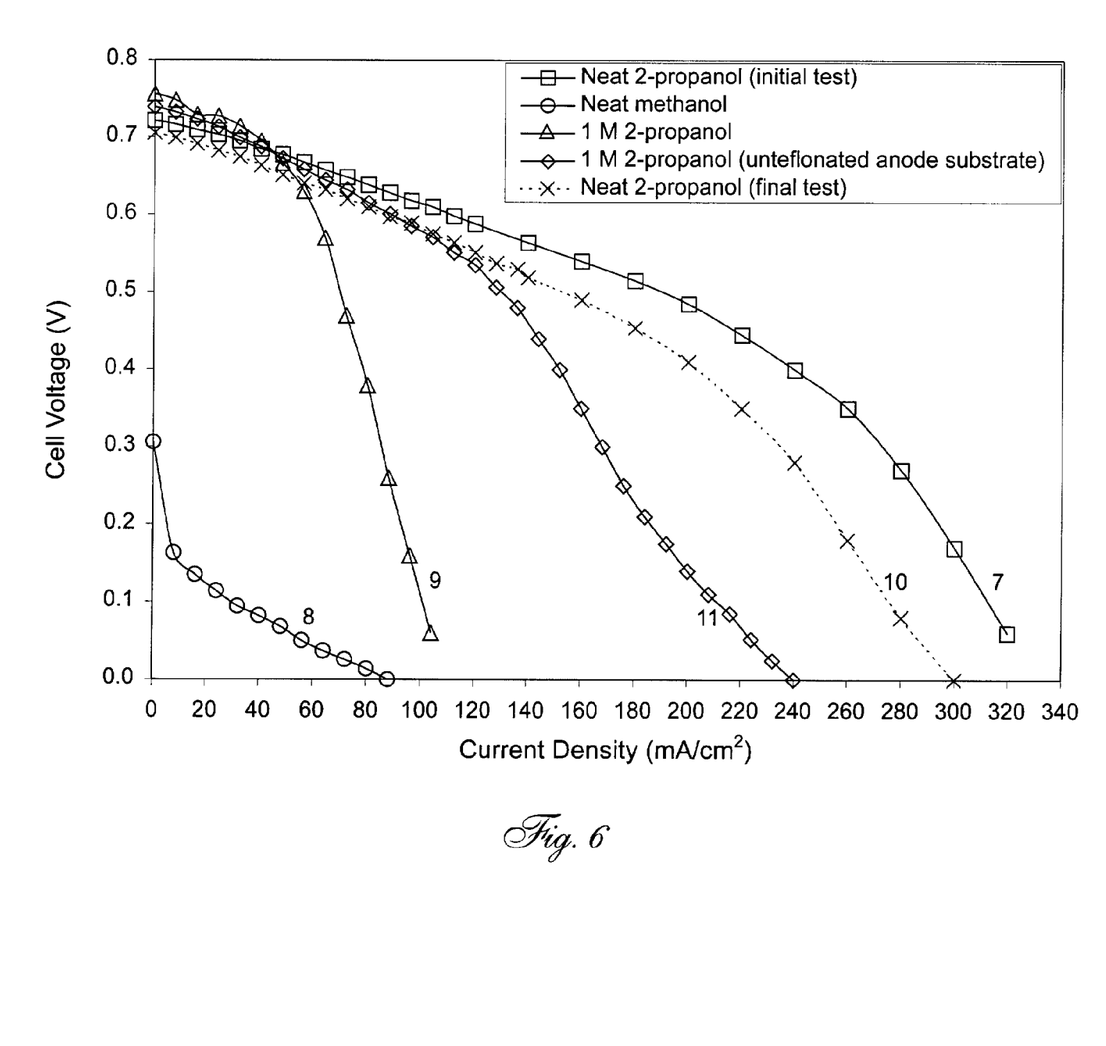
FIG. 6 depicts a graph showing a comparison of the performance of a direct oxidation fuel cell employing neat 2-propanol, neat methanol, and 1 M 2-propanol at a cell temperature of 60° C.

Referring to FIG. 6, the graph depicts a comparison between fuel cell performance when neat 2-propanol, neat methanol, and 1 M 2-propanol aqueous solutions were used as fuel. The tests were performed in the following sequence: neat 2-propanol, neat methanol, 1 M 2-propanol aqueous solution, and neat 2-propanol again. The performance of neat methanol was so low (curve 8) that it could not compare with 2-propanol at all. At current densities less than 40 mA/cm$^2$, 1 M 2-propanol solution had the best performance, but it declined quickly when the current density was increased as shown by curve 9. This test was performed after the cell was used to test neat methanol, and, inexplicably, it took an abnormally long time for the open circuit voltage to increase to the value shown in FIG. 6. The cell could be adversely affected by the neat methanol test, but when neat 2-propanol was tested again, the cell still possessed a good performance, although it was a little lower than the initial tests.

On the other hand, it could be due to the fact that the anode substrate was teflonated, which could hinder the 2-propanol aqueous solution from passing through the substrate in order to reach the catalyst layer. For comparison, the performance of an MEA whose anode substrate was not teflonated was shown in FIG. 6 as curve 11. This substrate gave a better performance, but it was still lower than the situation when neat 2-propanol was used at current densities higher than 50 mA/cm².

Figure 7:
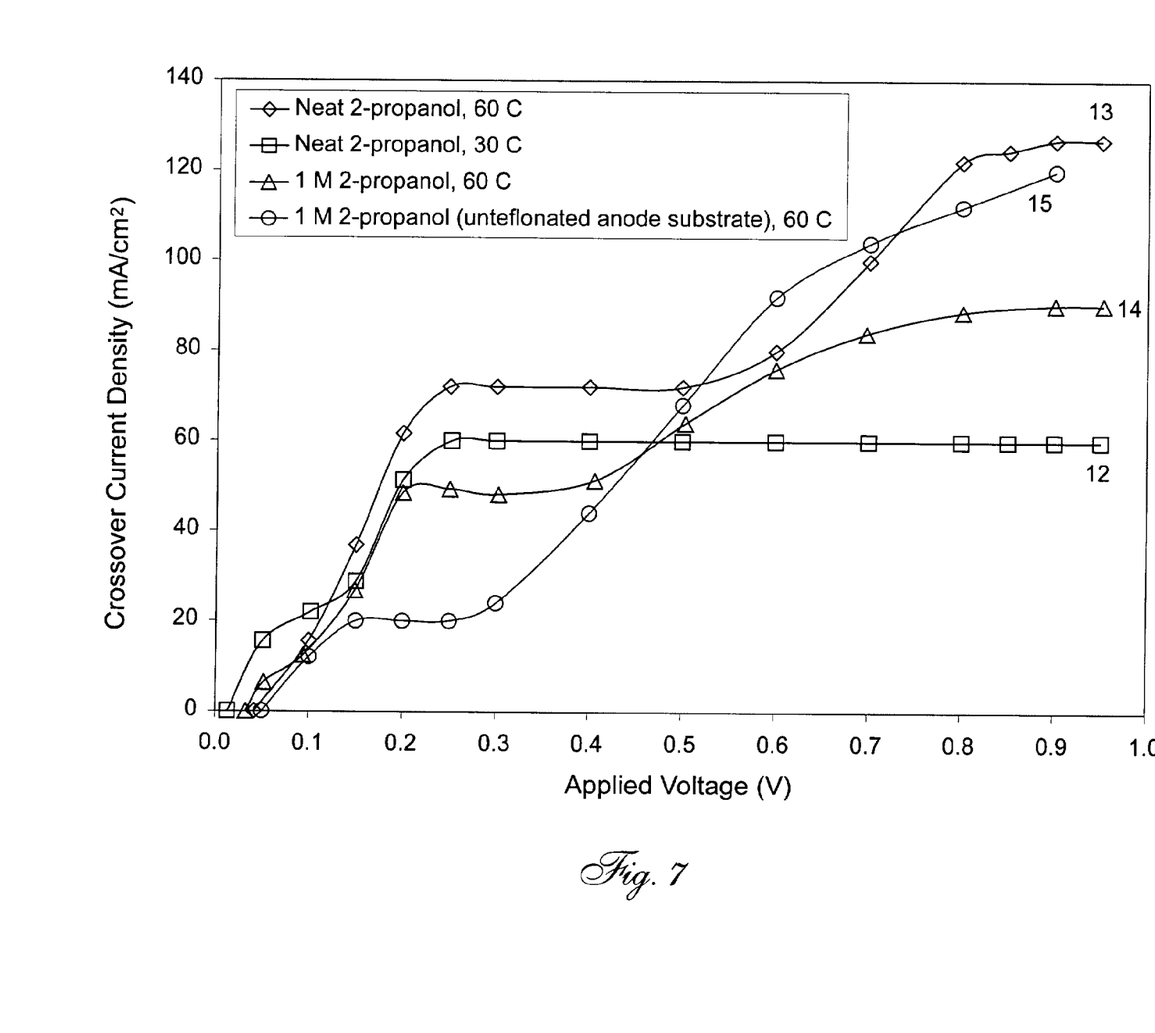
FIG. 7 illustrates a graph comparing 2-propanol crossover current densities under various direct oxidation fuel cell conditions.

The results of alcohol crossover were measured electrochemically, and are shown in FIG. 7. All the curves have four distinct regions: initial quick increase in the low applied voltage region, a plateau in the low-middle voltage region, another quick increase in middle-high voltage region, and finally, a plateau in the highest voltage region. The formation of the first plateau region could be due to formation of poisoning species from oxidation of 2-propanol. When higher voltage was applied, the adsorption of poisoning species became weaker, and higher current was measured. The limiting current in the highest voltage region (i.e., higher than approximately 0.8 V) should be taken as the current representing the alcohol crossover. When the cell temperature was increased from 30 to 60° C., the methanol crossover was doubled (curves 12 versus 13). The crossover of 2-propanol from 1 M aqueous solution was about ⅔ of that from neat 2-propanol (curves 14 versus 13).

For a comparison, the crossover current of an MEA whose anode substrate was not teflonated, was also shown in curve 15. Its limiting crossover current was similar to that of the neat 2-propanol, as observed by curves 15 versus 13. It was not surprising that comparable crossover currents resulted between neat 2-propanol and 1 M aqueous solution. This was because the SPEEK membrane swells much less in the absence of water, making it more effective in blocking alcohol crossover, even the neat alcohol concentration is much higher.

While a PEM fuel cell has been used for purposes of disclosure, the inventive method may also be used with other types of fuel cells; for example, liquid electrolyte, alkaline, phosphoric acid, molten carbonate, and solid oxide. Such cells are well known to those of skill in the art and are not further described herein.

Since other modifications and changes varied to fit particular operating requirements and environments will be apparent to those skilled in the art, the invention is not considered limited to examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of operating a direct oxidation fuel cell, the steps comprising:
    a) providing a solid membrane, direct oxidation fuel cell having an anode region, a cathode region, and a membrane operatively disposed therebetween;
    b) when operating said fuel cell, continuously providing exclusively neat 2-propanol directly to said anode region; and
    c) providing an oxygen-containing gaseous fluid to said cathode region at a selectively controlled flow rate;
whereby direct electrochemical oxidation of said neat 2-propanol occurs at said anode region.

2. The method of operating a direct oxidation fuel cell as recited in claim 1, wherein said membrane comprises a proton exchange membrane (PEM).

3. The method of operating a direct oxidation fuel cell as recited in claim 2, wherein said membrane comprises a membrane from the group: non-fluorinated membranes, partially fluorinated membranes, and perfluorinated membranes.

4. The method of operating a direct oxidation fuel cell as recited in claim 1, wherein said step (b) providing exclusively neat 2-propanol comprises pumping neat 2-propanol from a reservoir.

5. The method of operating a direct oxidation fuel cell as recited in claim 4, wherein said step (b) providing exclusively neat 2-propanol further comprises returning unoxidized neat 2-propanol from said anode region to said reservoir.

6. The method of operating a direct oxidation fuel cell as recited in claim 5, wherein said step (b) providing exclusively neat 2-propanol further comprises at least one of the sub-steps:
    i) condensing from a vapor state said unoxidized neat 2-propanol prior to the return thereof to said reservoir; and
    ii) releasing gaseous products of said electrochemical oxidation.

7. The method of operating a direct oxidation fuel cell as recited in claim 1, wherein said oxygen-containing gaseous fluid comprises air.

8. The method of operating a direct oxidation fuel cell as recited in claim 7, wherein said step (c) comprises the sub-step of humidifying said air.

* * * * *